US011983997B2

(12) United States Patent
Heathcote et al.

(10) Patent No.: US 11,983,997 B2
(45) Date of Patent: *May 14, 2024

(54) LOTTERY GAMING SYSTEM

(71) Applicant: IGT Global Solutions Corporation, Providence, RI (US)

(72) Inventors: Bradford Heathcote, Cumberland, RI (US); Aaron Michael Koll, Lincoln, CA (US); Sarah Simpkins, Warwick, RI (US)

(73) Assignee: IGT Global Solutions Corporation, Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,148

(22) Filed: May 10, 2023

(65) Prior Publication Data

US 2023/0274619 A1 Aug. 31, 2023

Related U.S. Application Data

(63) Continuation of application No. 17/644,158, filed on Dec. 14, 2021, now Pat. No. 11,682,268, which is a continuation of application No. 16/700,068, filed on Dec. 2, 2019, now Pat. No. 11,222,511.

(51) Int. Cl.
*G07F 17/32* (2006.01)

(52) U.S. Cl.
CPC ........ *G07F 17/329* (2013.01); *G07F 17/3223* (2013.01)

(58) Field of Classification Search
CPC .......................... G07F 17/329; G07F 17/3223
See application file for complete search history.

(56) References Cited

U.S. PATENT DOCUMENTS

| | | | |
|---|---|---|---|
| 6,877,745 | B1 | 4/2005 | Walker et al. |
| RE46,405 | E | 5/2017 | Michel |
| 2011/0195769 | A1 | 8/2011 | Frick et al. |
| 2012/0071222 | A1 | 3/2012 | Burks et al. |
| 2012/0299241 | A1 | 11/2012 | Frick et al. |
| 2015/0206376 | A1 | 7/2015 | Reid et al. |
| 2016/0314656 | A1 | 10/2016 | Book |
| 2018/0330571 | A1 | 11/2018 | Jones |
| 2019/0287344 | A1 | 9/2019 | Oberberger |
| 2019/0355209 | A1 | 11/2019 | Sorey et al. |

*Primary Examiner* — Werner G Garner
(74) *Attorney, Agent, or Firm* — Neal, Gerber & Eisenberg LLP

(57) ABSTRACT

A lottery gaming system that enables a player to select any one of a plurality of different geographic areas in which they predict that a designated winning lottery ticket will be purchased.

20 Claims, 6 Drawing Sheets

300

LOTTERY GAMING SYSTEM

PRIORITY

This application is a continuation of, claims priority to and the benefit of U.S. Non-Provisional patent application Ser. No. 17/644,158, filed Dec. 14, 2021, which is a continuation of, claims priority to and the benefit of U.S. Non-Provisional patent application Ser. No. 16/700,068, filed Dec. 2, 2019, now U.S. Pat. No. 11,222,511, issued on Jan. 11, 2022, the entire contents of each of which are incorporated herein by reference.

BACKGROUND

The present disclosure relates to lottery gaming systems, lottery tickets, and methods of operating lottery gaming systems that enable the play of lottery games. Lottery gaming systems may enable a player to select one or more numbers for a lottery ticket, randomly select winning drawn lottery numbers, and if the winning drawn lottery numbers match the player-selected numbers, provide the player an award associated with the player-selected numbers.

BRIEF SUMMARY

In various embodiments, the present disclosure relates to a lottery gaming system including a processor and a memory device that stores a plurality of instructions, that when executed by the processor, cause the processor to for a play of a lottery game: determine a player set of symbols; determine one of a plurality of different geographic areas to be a player selected geographic area; generate a lottery ticket including an indication of the player set of symbols and an indication of the player selected geographic area; store data associated with the lottery ticket; and cause the lottery ticket to be provided to the player. The plurality of instructions, when executed by the processor further cause the processor to, at a draw time, randomly select a quantity of winning draw symbols; and responsive to one of a plurality of generated lottery tickets for the play of the game being a designated winning lottery ticket and that designated winning lottery ticket being purchased in the player selected geographic area, determine an award associated with the player selected geographic area to provide to the player.

In various embodiments, the present disclosure relates to a lottery ticket including a substrate and a selected symbols portion on the substrate including an indication of a quantity of symbols from a plurality of different symbols that form a player set of symbols for a play of a lottery game. The lottery ticket further includes a selected geographic area portion on the substrate including an indication of a player selected geographic area from a plurality of different geographic areas for the play of lottery game in, wherein the player selected geographic area is associated with one of a plurality of different awards associated with the plurality of different geographic areas. The lottery ticket further includes a ticket identification portion on the substrate including an indication of an identification of the lottery ticket.

In various embodiments, the present disclosure relates to a method of operating a gaming system, the method including for a play of a lottery game: determining, via a processor, a player set of symbols; determining, via the processor, one of a plurality of different geographic areas to be a player selected geographic area; generating, via the processor, a lottery ticket including an indication of the player set of symbols and an indication of the player selected geographic area; storing, via the processor and a memory device, data associated with the lottery ticket; and causing the lottery ticket to be provided to the player. The method further includes, at a draw time, randomly selecting, via the processor, a quantity of winning draw symbols. The method further includes, responsive to one of a plurality of generated lottery tickets for the play of the game being a designated winning lottery ticket and that designated winning lottery ticket being purchased in the player selected geographic area, determining, via the processor, an award associated with the player selected geographic area to provide the player.

Additional features are described in, and will be apparent from, the following Detailed Description and the figures.

DETAILED DESCRIPTION

In various embodiments, the present disclosure related generally to a lottery gaming system and a method of operating a lottery gaming system that provides a lottery game and an associated geographic area selection game. In various embodiments, the lottery gaming system and method of operating the lottery gaming system enable a player to select any one of a plurality of different geographic areas in which they predict that a designated winning lottery ticket (such as for the top award) will be purchased. In various embodiments, the lottery gaming system and method of operating the lottery gaming system enables a player to purchase a lottery ticket that includes the player selected geographic area.

Figure 1:
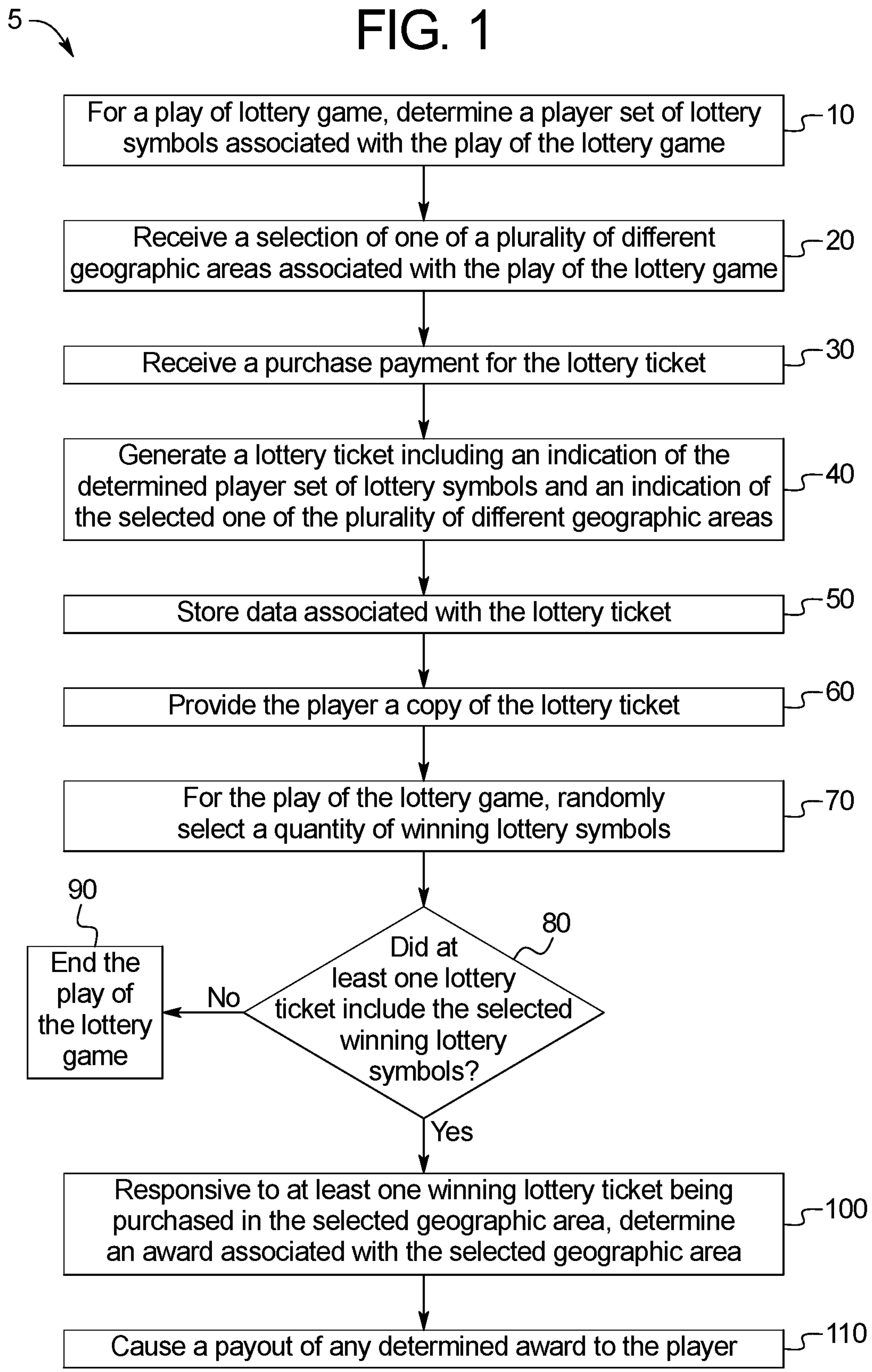
FIG. 1 is a flow chart of an example method for operating a lottery gaming system of one embodiment of the present disclosure.

FIG. 1 is a flowchart of an example method or process (indicated by numeral 5) of operating an example lottery gaming system of the present disclosure. In various embodiments, the process 5 is represented by a set of instructions stored in one or more memory devices and executed by one or more processors. Although the process 5 is described with reference to the flowchart shown in FIG. 1, many other processes of performing the acts associated with this illustrated example method may be employed. For example, the order of certain of the illustrated blocks and/or diamonds may be changed, certain of the illustrated blocks and/or diamonds may be optional, or certain of the illustrated blocks and/or diamonds may not be employed.

In the example embodiment illustrated in FIG. 1, the process 5 includes the lottery gaming system configured to: (1) for a play of a lottery game, determine a player set of lottery symbols associated with the play of the lottery game, as indicated by block 10; (2) receive a selection of one of a plurality of different geographic areas associated with the play of the lottery game, as indicated by block 20; (3) receive a purchase payment (that functions as a wager) for the lottery ticket from the player, as indicated by block 30; (4) generate a lottery ticket including an indication of the determined player set of lottery symbols and an indication of the selected one of the plurality of different geographic areas, as indicated by block 40; (5) store data associated with the lottery ticket, as indicated by block 50; (6) provide the player a paper copy and/or a virtual copy of the lottery ticket, as indicated by block 60; (7) for the play of the lottery game, randomly select a quantity of winning lottery symbols, as indicated by block 70; (8) determine if at least one lottery ticket includes the selected winning lottery symbols, as indicated by diamond 80; (9) if it is determined that at least one lottery ticket did not include the selected winning lottery symbols, end the play of the lottery game, as indicated by block 90; (10) on the other hand, as indicated by diamond 80, responsive to at least one winning lottery ticket including the selected winning lottery symbols, and responsive to at least one winning lottery ticket being purchased in the selected geographic area, determine an award associated with the selected geographic area, as indicated by block 100; and (11) cause a payout of any determined award to the player for the lottery ticket, as indicated by block 110.

In various example embodiments, the player set of lottery symbols includes a set of different numbers and the lottery gaming system is configured to: (1) receive from the player a selection of a plurality of different lottery numbers to wager on for a lottery ticket to be purchased by the player; (2) receive a purchase payment (that functions as the wager) for the lottery ticket from the player; (3) create a lottery ticket for the player based on the player-selected numbers; (4) store data associated with the lottery ticket; (5) provide the player a paper copy and/or a virtual copy of the lottery ticket; (6) at the designated draw time for the play of the lottery game, randomly select a set of winning drawn lottery numbers for the play of the lottery game; (7) determine whether any of the player-selected numbers of the lottery ticket match the winning drawn lottery numbers; (8) based on this determination, determine any award(s) for the lottery ticket associated with the matching numbers between the player-selected numbers and the winning drawn lottery numbers; and (9) cause a payout of any such determined award(s) to the player for the lottery ticket. It should thus be appreciated that the symbols employed by the lottery gaming system and method of the present disclosure may be any suitable symbols.

In various other example embodiments, the player set of lottery symbols include a set of different numbers that are randomly determined by the lottery gaming system (based on a quick pick request from the player), and the lottery gaming system is configured to: (1) receive a request from the player for a random selection, via the lottery gaming system, of a plurality of different lottery numbers to wager on for a lottery ticket to be purchased by the player; (2) receive a purchase payment (that functions as the wager) for the lottery ticket from the player; (3) create a lottery ticket for the player based on the gaming system-selected numbers; (4) store data associated with the lottery ticket; (5) provide the player a paper copy and/or a virtual copy of the lottery ticket; (6) at the designated draw time for the play of the lottery game, randomly select a set of winning drawn lottery numbers for the play of the lottery game; (7) determine whether any of the gaming system-selected numbers of the lottery ticket match the winning drawn lottery numbers; (8) based on this determination, determine any award(s) for the lottery ticket associated with the matching lottery numbers between the gaming system-selected numbers and the winning drawn lottery numbers; and (9) cause a payout of any such determined award(s) to the player for the lottery ticket. It should thus be appreciated that the symbols employed by the lottery gaming system and method of the present disclosure may be any suitable symbols.

In various other example embodiments, the plurality of different geographic areas associated with the play of the lottery game are states of the United States and the lottery gaming system is configured to: (1) receive from the player a selection of one of the plurality of different states to wager on for a lottery ticket to be purchased by the player; (2) receive a purchase payment (that functions as the wager) for the lottery ticket from the player; (3) create a lottery ticket for the player based on the player-selected state; (4) store data associated with the lottery ticket; (5) provide the player a paper copy and/or a virtual copy of the lottery ticket; (6) at the designated draw time for the play of the lottery game, randomly select a set of winning drawn lottery numbers for the play of the lottery game; (7) determine whether any purchased lottery tickets for the play of the lottery game include a designated winning ticket; (8) based on this determination, determine whether the player selected state matches a state that any of the determined designated winning lottery tickets was purchased in; (9) determine any awards associated with the matching player-selected state for the lottery ticket; and (10) cause a payout of any such determined awards to the player for the lottery ticket. It should thus be appreciated that the different geographic areas employed by the lottery gaming system and method of the present disclosure may be any suitable geographic area such as but not limited to, a plurality but not all of the states of the United States, a plurality of different countries, a plurality of different cities, a plurality of different counties, and any other suitable geographic areas. It should also be appreciated that the player may instruct or otherwise request the lottery gaming system to randomly select one of the plurality of different states to wager on for the lottery ticket.

In various example embodiments, the lottery gaming system determines any award(s) (such as a jackpot award or a progressive award) for the play of the lottery game associated with a designated winning lottery ticket. In one example, a lottery ticket is a designated winning lottery ticket if the player set of numbers of the lottery ticket match each of the winning drawn lottery numbers. That is, the gaming system awards an award to a player if that player's numbers match all of the winning drawn lottery numbers. In other example embodiments, less that all of the numbers need to be matched for the lottery ticket to be a designated winning lottery ticket. In one such example, the designated winning ticket includes a match of at least one player number and one of the winning drawn lottery numbers. That is, the gaming system awards the award to a player if that player's numbers match at least one of the winning drawn lottery numbers. In various embodiments, the present disclosure contemplates providing the award associated with the selection of the correct geographic area: (1) if one of the lottery tickets purchased in that selected geographic area wins the largest award such as a top jackpot award or top progressive award, or (2) if one of the lottery tickets purchased in that selected geographic area wins another one of the awards that is a designated award.

For example, for a multi-state random draw lottery game where each player picks (or quick picks) 6 out of 80 numbers, the system randomly draws 6 numbers, and a player wins the top jackpot award if the player's 6 numbers match the drawn 6 numbers, the gaming system can provide a separate geographic area award associated with a correct selection of the state where that winning lottery ticket that resulted in the top jackpot award was purchased. This separate geographic area award could be provided to the player that won the top jackpot award (if that player also selected the correct state) or can be provided to one or more other players that picked the correct state of that winning lottery ticket that resulted in the top jackpot award.

In another example, for a multi-state random draw lottery game where each player picks (or quick picks) 6 out of 80 numbers, the system randomly draws 6 numbers, and a player wins the top jackpot award if the player's 6 numbers match the drawn 6 numbers, the gaming system can provide a separate geographic area award associated with a correct selection of the state where a winning lottery ticket for another designated award (other than the top jackpot award) such as an award for correctly selecting 5 of 6 numbers.

It should be appreciated that the award(s) associated with the correct geographic area selection can be any suitable awards. These awards can be static, in static ranges, in changeable ranges, or otherwise changeable. In various embodiments, the changeable awards can be progressive awards, pari-mutuel awards, or other suitable changeable awards. In various embodiments, the awards can be static or changeable based on the wager level of the player, or otherwise.

In various example embodiments, the lottery gaming system determines any awards (such as a static award or a pari-mutuel award) for the play of the lottery game associated with the player-selected state matching a state that a designated winning lottery ticket was purchased in. For example, in one such embodiment, the player selects California as the player-selected state for the play of the lottery game, if at least one designated winning lottery ticket was purchased in California, the lottery gaming system awards the award to the player based on the player-selected state matching the state a designated winning lottery ticket was purchased in.

In various example embodiments, the purchase payment for the lottery ticket includes a wager placed on the set of lottery symbols and a wager placed on one of the plurality of different geographic areas. In one example embodiment, the wager placed on the set of lottery symbols is a separate wager from the wager placed on one of the plurality of different geographic areas. In another example embodiment, the wager placed on the set of lottery symbols includes the wager placed on one of the plurality of different geographic areas (i.e., only one wager is made). In various other example embodiments, the lottery gaming system does not require any extra or additional payment or wager to be placed on one of the plurality of different geographic areas.

In various embodiments, as mentioned above, the geographic areas are states, but it should be appreciated that the geographic areas can be any suitable areas such as regions (including multiple states), countries, counties, cities, towns, or any other suitable defined areas.

In various embodiments, the purchase payment for the lottery ticket includes only a wager placed on one of the plurality of different geographic areas. That is, the player can choose to only wager on a winning geographic area, such as a state where a winning lottery ticket is purchased, for the play of the lottery game.

In various embodiments, as further described below, the lottery gaming system and method are configured to be provided by a lottery agency (such as a state lottery agency). In various other embodiments, as further described below, the lottery gaming system and method are configured to be operated by a third party that runs the lottery for a lottery agency (such as a state lottery agency).

In various embodiments, the lottery gaming system thus provides a designated award in a second game based on where (i.e., a geographic area where) a designated award is won in a related first game. It should be appreciated that the first game may be any suitable game other than the example draw lottery games described herein.

Example Embodiment

In one example embodiment of the present disclosure, the lottery gaming system is configured to: (1) enable the player to select a plurality of the numbers, such as but not limited to numbers 1 through 80 (inclusive of 1 and 80) for a lottery ticket; (2) enable the player to select one of a plurality of different geographic areas for that lottery ticket; enable the player to place a wager (e.g., $1, $2, $5, or $10) on each of the selected numbers and/or the selected geographical area for that lottery ticket; and (3) randomly select a quantity of winning drawn lottery numbers associated with the player-selected lottery numbers. In this example embodiment, the lottery gaming system is configured such that a first award for the play of the lottery game is associated with matching one or more numbers of the player set of numbers and the winning drawn lottery numbers of a designated winning lottery ticket. In this example embodiment, the lottery gaming system is configured such that a second award for the play of the lottery game is associated with matching the player-selected geographic area with a geographic area that a designated winning lottery ticket was purchased in. It should be appreciated that in other embodiments of the present disclosure, the quantity of numbers, the numbers themselves, the quantity of geographic areas, the geographic areas themselves, the quantity of wager amounts, the wager amounts themselves, the quantity of awards, the awards themselves, may vary in accordance with the present disclosure.

In various example embodiments, the designated winning lottery ticket associated with the play of the lottery game includes matching each lottery number between the player set of numbers and the winning drawn lottery numbers. In various other example embodiments, the designated winning lottery ticket associated with the play of the lottery game includes matching at least one lottery number between the player set of numbers and the winning drawn lottery numbers.

In various embodiments of the present disclosure, the lottery gaming system is configured to enable the player to use one or more paper or virtual playslips to select the player selectable numbers, the player selectable geographic area, the wager level (e.g., a wager amount on the player-selected numbers and/or the player-selected geographic area), and to purchase the lottery ticket. In various embodiments, the player selectable geographic area is on a separate playslip then the player selectable numbers.

Figure 2:
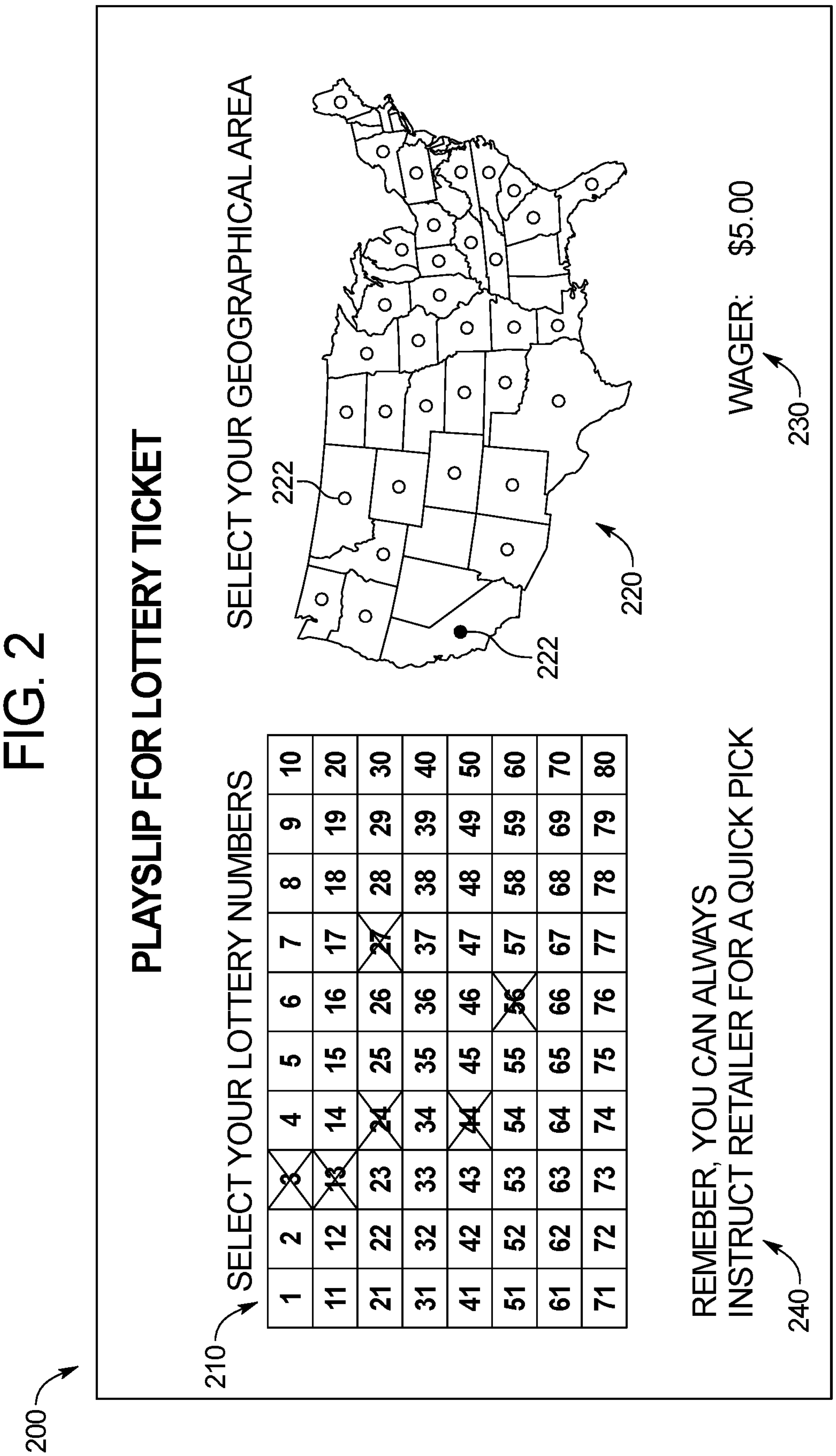
FIG. 2 is an example lottery play slip of one example embodiment of the lottery gaming system of present disclosure.

In the example illustrated embodiment shown in FIG. 2, the lottery gaming system is configured to enable the player to use a single paper or virtual playslip to select the player selectable numbers, the player selectable geographic area, the wager level (e.g., a wager amount on the player-selected numbers and/or the player-selected geographic area), and to purchase the lottery ticket. FIG. 2 illustrates an example playslip 200. This playslip 200 includes: (1) a symbol (or number) selection portion 210; (2) a geographic area selection portion 220; (3) a wager indication portion 230; and (4) a quick pick instruction portion 240. That is, instead of the player using the symbol selection portion 210 for the selection of a plurality of lottery symbols, the player may request the lottery system to randomly select symbols (or numbers) for the play of the lottery game. It should be appreciated that other embodiments of the playslip may include a player to have the system randomly select the geographic area in accordance with the present disclosure. It should be appreciated that other embodiments of the playslip may include additional or alternative portions and player options and can be arranged in any suitable manner in accordance with the present disclosure. It should be appreciated that in other embodiments, the geographic area selection portion 220 is on a separate playslip.

In this example illustrated embodiment shown in FIG. 2, the number selection portion 210 of the playslip 200 includes eighty different player-selectable numbers from which the player can select one or more numbers, and particularly a separate individual selectable area for each of the numbers 1 through 80 (inclusive of 1 and 80). In this example, each area includes a respective different number surrounded by a rectangular boarder. It should be appreciated that while the number selection portion 210 includes eighty different player-selectable numbers, any suitable arrangement of numbers (or symbols) may be possible.

As shown in FIG. 2, in this example illustrated embodiment, the player has selected six numbers (and particularly, the numbers “3,” “13,” “24,” “27,” “44,” and “56”) on the playslip 200 for their lottery ticket. These player-selected numbers (that form the player set of numbers) are marked with Xs over the respective numbers in this example. It should be appreciated that the player-selected numbers may be marked in any other suitable manner.

In this example illustrated embodiment shown in FIG. 2, the geographic selection portion 220 of the playslip 200 includes a map of the United States from which the player can select one of a plurality of different states that are the geographic areas. In this example embodiment, each selectable state of the geographic selection portion 220 includes a state selection indicator 222 that indicates a particular state is selectable for the play of the lottery game. In this example embodiment, not every state displayed on the geographic selection portion 220 is selectable by the player. For example, certain states may not participate in the play of the lottery game. As such, participating states are designated as selectable states of the geographic selection portion 220 and include the state selection indicator 222, while non-participating states are designated as non-selectable states of the geographic selection portion 220, and do not include the state selection indicator 222. It should be appreciated that the player may select more than one of the plurality of different states to place a wager on for the play of the lottery game. It should be appreciated that the player can have the geographic area randomly selected by the processor of the lottery gaming system in a quick pick manner. In other words, the processor of the lottery gaming system can, for a play of the lottery game, determine one of a plurality of different geographic areas to be a player selected geographic area for that play of the game.

As shown in FIG. 2, in this example illustrated embodiment, the player has selected the state of California (CA) on this playslip 200 to wager on for their lottery ticket. This player-selected geographic area is indicated on the geographic selection portion 220 by a darkened state selection indicator 222 associated with the state of California. It should be appreciated that the player-selected geographic area may be marked or otherwise indicated in any other suitable manner.

In this example embodiment of FIG. 2, the wager indication portion 230 of the playslip 200 includes a wager entry portion that the player may utilize for placing a wager on the play of the lottery game. For example, the player may indicate a wager level of $1, $2, $5, $10, or other such suitable wager on the play of the lottery game. In this example embodiment, the player may indicate a desired wager amount placed on the player-selected lottery numbers selected in the number selection portion 210, and the player-selected geographic area selected in the geographical area selection portion 220. In this example embodiment, a single player indicated wager amount is applied to each of the player-selected numbers and the player-selected geographic area. In other example embodiments that are not shown, the lottery gaming system and method provides a playslip that enables the player to indicate different and/or separate wager amounts for the player-selected numbers and the player-selected geographic area. For example, the player may place a first wager amount on the player-selected numbers and a second different wager amount on the player-selected geographic area. Alternatively, the player may place a wager amount only on the player-selected geographic area (and not select and/or wager on any player-selected numbers).

As shown in FIG. 2, in this example, the player has indicated a wager of $5 for the player-selected numbers and the player-selected geographic area. This player indicated wager amount is marked on the playslip 200 with “$5.00” marked in wager indication portion 230.

In this example embodiment of FIG. 2, the quick pick instruction portion 240 of the playslip 200 includes a message “REMEMBER, YOU CAN ALWAYS INSTRUCT RETAILER FOR A QUICK PICK,” that reminds the player they can have the lottery gaming system randomly select the numbers for the play of the lottery game. In this example embodiment, the player has selected numbers in the number selection portion 210 of the playslip 200. As such, the player selects their own numbers for the play of the lottery game. In other example embodiments that are not shown, if the player would like the lottery gaming system to randomly pick the plurality of numbers for the play of the lottery game, the player does not select any numbers in the number selection portion 210, and instructs the lottery gaming system to randomly select the plurality of numbers.

In other example embodiments that are not shown, the lottery gaming system may enable the player to instruct the lottery gaming system to randomly pick a geographic area for the play of the lottery game. As such, if the player would like the lottery gaming system to randomly pick one of the plurality of geographic areas for the play of the lottery game the player does not select a geographic area in the geographic area selection portion 220, and instructs the lottery gaming system to randomly select one of the plurality of geographic areas.

After making all of the needed player selections on the playslip 200, the lottery gaming system enables the player to purchase a lottery ticket through the lottery gaming system. In various embodiments of the lottery gaming system, the playslip is paper and the player may purchase the lottery ticket via the paper playslip. In various other embodiments of the lottery gaming system, the playslip is virtual and the player may purchase the lottery ticket via the virtual playslip. In various other embodiments, the lottery gaming system is configured to accommodate both paper and virtual playslips.

In various embodiments of the lottery gaming system, the player may purchase the lottery ticket via any suitable manner such as, but not limited to, one of the following: (1) a dedicated lottery kiosk (e.g., a lottery kiosk) configured to communicate over a data network (such as the Internet) to a lottery server (such as a lottery server 606 described below in connection with FIG. 6); (2) a retailer-operated lottery terminal configured to communicate over a data network (such as the Internet) to a lottery server (such as a lottery server 606 described below in connection with FIG. 6); (3) a personal computer configured to communicate over a data network (such as the Internet) to a lottery server (such as a lottery server 606 described below in connection with FIG. 6); and/or (4) a personal mobile device (such as a cellular telephone, tablet, a smart phone, or PDA) configured to communicate over a data network (such as a wireless or cellular data network) to a lottery server (such as a lottery server 606 described below in connection with FIG. 6).

In one such example, the lottery gaming system enables a player to use a paper playslip to purchase a lottery ticket at a retail location having a lottery terminal configured to receive the playslip and print the lottery ticket at the time of purchase in a conventional manner. In such lottery gaming systems, the retail operator typically receives the purchase price for the lottery ticket from the player in a conventional manner.

In another such example, the lottery gaming system enables a player to use a virtual playslip to purchase a lottery ticket through a retail lottery kiosk configured to display the playslip (as further described below), receive the player selections using the displayed playslip (as further described below), receive the wager from the player, and print the lottery ticket at the time of purchase. This example lottery kiosk may include an integral printer device and/or be in communication with a printer device for providing a printed lottery ticket to the player.

In another such example, the lottery gaming system enables a player to use a virtual playslip to purchase a lottery ticket electronically using a personal mobile device such as the player's mobile telephone. In one such embodiment, the lottery gaming system receives from this device the player selections and the wager from the player, and sends the player a virtual lottery ticket (which in certain instances can be printed by the player using a suitable personal printing device). Thus, it should be appreciated that in various example embodiments, the player may purchase a lottery ticket with a personal mobile device and, thus, may not be provided with a physical (i.e., paper) lottery ticket. Instead, an electronic (or virtual) version of the lottery ticket is provided to the player via, for example, an electronic mail to an email account associated with the player.

Figure 3:
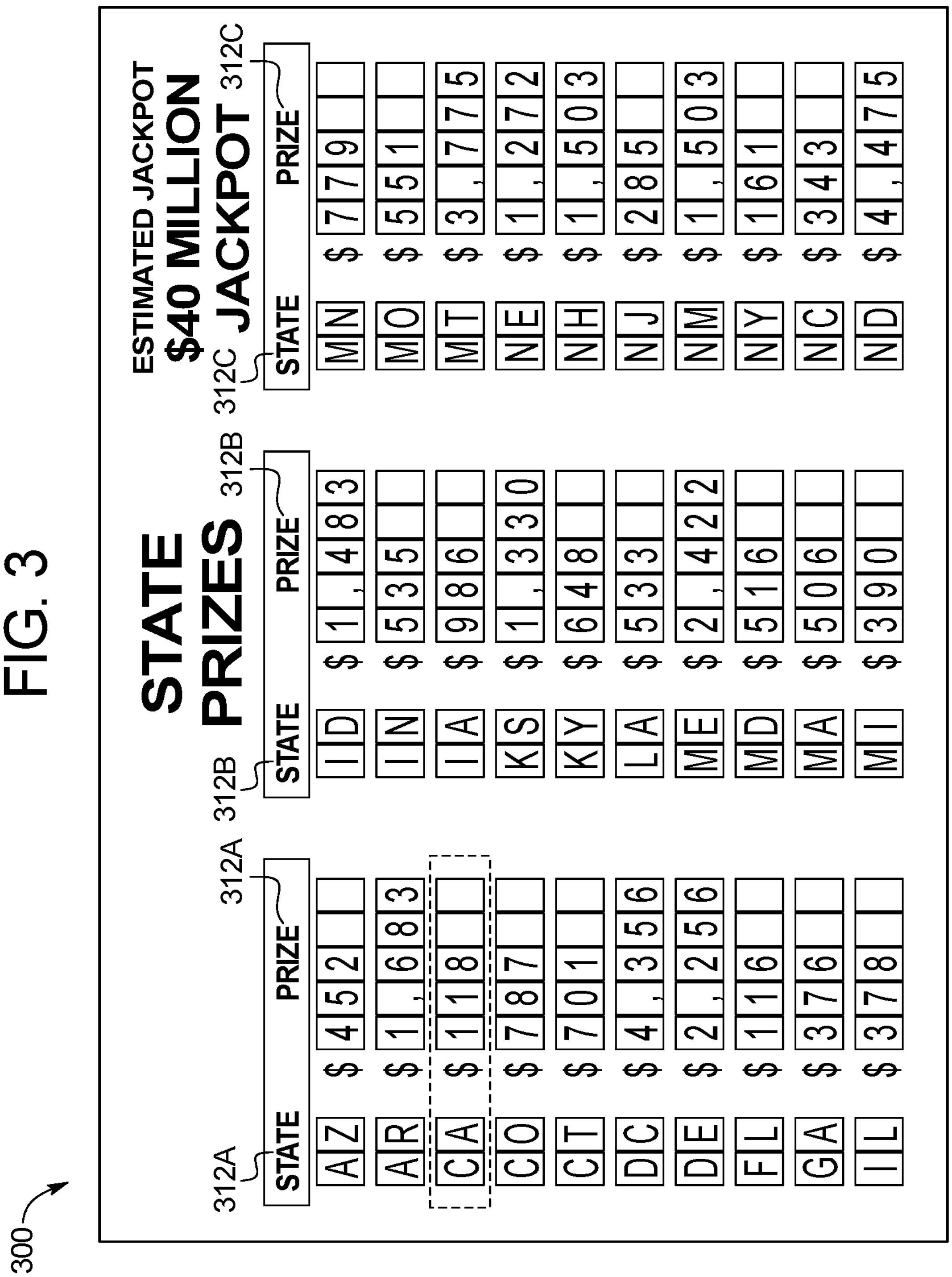
FIG. 3 is an example estimated paytable of one example embodiment of the lottery gaming system of present disclosure.

FIG. 3 illustrates one example paytable 300 associated with and respectively corresponding to the plurality of geographical areas shown in the geographical area selection portion 220 of FIG. 2. In this example illustrated embodiment, the geographical area paytable 300 includes: (1) a geographical area identifier column such as columns 310A, 310B, and 310C; and (2) a geographical area expected payout column such as columns 312A, 312B, and 312C.

In this example illustrated embodiment, each geographical area identifier column 310A, 3106, and 310C includes a plurality of different geographical area identifiers (e.g., state abbreviations such as AZ, AR, CA, etc.) that are associated with one of the geographical areas shown in the geographical selection portion 220 of FIG. 2. In this example embodiment, each geographical area identifier is associated with an expected or estimated payout displayed in the respective geographical area expected payout column 312A, 312B, and 312C. Thus, in this example embodiment, a player selecting California (i.e., CA), and placing a wager on that player-selected geographic area, would win an estimated $118 if a lottery ticket purchased in California was a designated winning lottery ticket.

In this example illustrated embodiment, the paytable 300 defines a plurality of pari-mutuel awards in the geographical area expected payout columns 312A, 312B, and 312C. In this example, each award of the plurality of pari-mutuel awards is associated with one of the geographical area identifiers displayed in the columns 310A, 310B, and 310C. In this example illustrated embodiment, the pari-mutuel award for each of the geographical areas is determined after all wagers for the play of the lottery game have been placed on the available lottery game wagering opportunities. In this example embodiment, the selection of a geographic area wagering opportunity includes placing a wager amount that a designated winning lottery ticket, for the play of the lottery game, will be purchased in that selected geographic area. That is, if a player selects and places a wager on the state of California, then the player is wagering on at least one designated winning ticket for the play of the lottery game being purchased in the state of California.

In this example illustrated embodiment, all geographic area wagers placed on a specific geographic area (e.g., wagers placed on a winning lottery ticket being purchased in California) are placed together in a pool and then after the deduction of applicable fees (e.g., the vigorish) and/or taxes, the estimated payoff amount and/or estimated payoff odds are determined by sharing the pool among all winning bets. For example, the lottery system displays a lottery game wagering opportunity to a player that they can place a wager on the play of the lottery game that a winning lottery ticket will be purchased in the state of California. In this example, the win amount (if a winning lottery ticket for the play of the lottery game was purchased in California) is determined after everyone participating on the play of the lottery game has wagered on what state a winning lottery ticket will be purchased in.

Thus, in this example illustrated embodiment, each of the geographical area expected payout columns 312A, 312B, and 312C include a plurality of different expected awards. In this example embodiment, each of different geographical area identifiers displayed in columns 310A, 310B, and 310C are associated with different expected awards.

In various example embodiments, the lottery system resets the awards associated with the geographic areas for each play of the lottery game.

In various example embodiments, the lottery system maintains the awards associated with the geographic areas until the designated award is won. For example, if the jackpot award is not won for a play of the lottery game, and thus no player wins that geographic area award for that play of the lottery game, the lottery gaming systems causes the awards respectively associated with each of the geographic areas to continue to grow. In certain such embodiments, a separate award pool is associated with each different geographic area. In various embodiments, the amounts wagered on the selection of each of the geographic area affects the amount of each award associated with each geographic area and the rates of growth of each such award.

Figure 4:
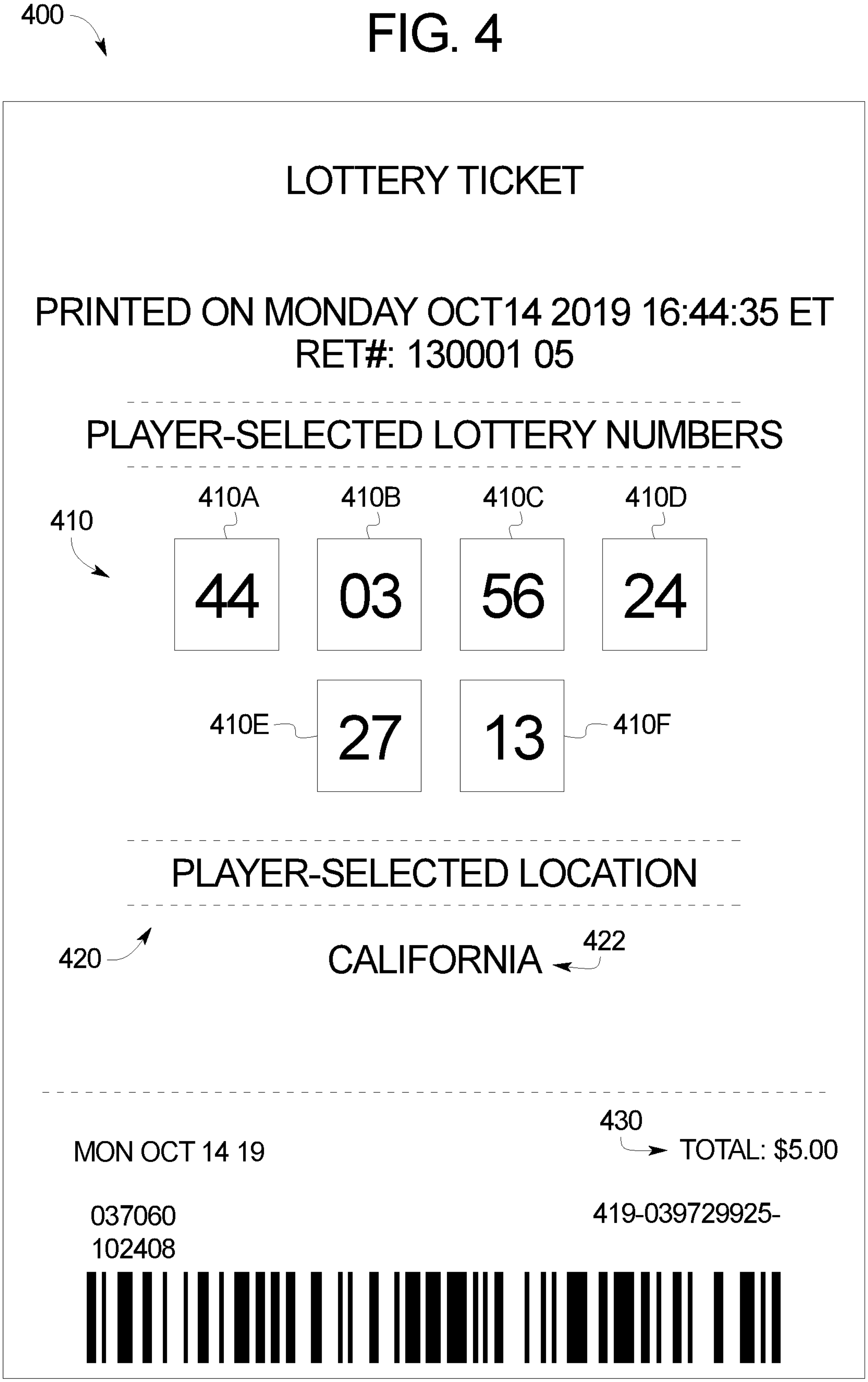
FIG. 4 is an example lottery ticket of one example embodiment of the lottery gaming system of present disclosure.

FIG. 4 illustrates an example lottery ticket 400 that may be issued to a player based on the player-selected numbers, player-selected geographic area, and wager amounts, indicated on their playslip (such as the example playslip 200 of FIG. 2). In this example embodiment, the lottery ticket 400 includes a selected symbols (or numbers) portion 410, a selected winning geographic area portion 420, and a total wager amount portion 430. It should be appreciated that in various embodiments, the lottery ticket may display or include additional or alternative information, such as a player identifier, a serial number, and/or any other relevant information. It should also be appreciated that the lottery ticket provided by the lottery gaming system of the present disclosure may be alternatively configured.

In this example illustrated embodiment, the selected numbers portion 410 of the lottery ticket 400 separately and individually includes and indicates each of the player-selected numbers (such as the respective player-selected numbers indicated in the number selection portion 210 of the playslip 200). In this example embodiment, each player-selected number includes a selected number identifier, such as number identifiers 410A, 410B, 410C, 410D, 410E, and 410F. The respective selected number identifiers correspond to the respective player-selected numbers.

In this example, the lottery ticket 400 may be determined as a designated winning lottery ticket for the play of the lottery game player if: (a) the number "44" 410A is selected as one of the winning drawn lottery numbers, (b) the number "3" 4106 is selected as one of the winning drawn lottery numbers, (c) the number "56" 410C is selected as one of the winning drawn lottery numbers, (d) the number "24" 410D is selected as one of the winning drawn lottery numbers, (e) the number "27" 410E is selected as one of the winning drawn lottery numbers, and (f) the number "13" 410F is selected as one of the winning drawn lottery numbers. In this example, the player of the designated winning lottery ticket for the play of the lottery game is provided a jackpot award associated with the play of the lottery game.

In this example illustrated embodiment, the selected geographic area portion 420 of the lottery ticket 400 indicates the player-selected geographic area (such as the respective player-selected geographic area indicated in the geographic area selection portion 220 of the playslip 200). In this example embodiment, the player-selected geographic area includes a selected geographic area identifier, such as geographic area identifier 422 that indicates "CALIFORNIA" as the player-selected geographic area for the play of the lottery game.

In this example, the lottery ticket 400 may be determined as a winning lottery ticket for the play of the lottery game player if a designated winning lottery ticket was purchased in the player-selected geographic area 422 of "California." As such, for a designated winning lottery ticket being purchased in the state of California, the player of the winning lottery ticket including the player-selected geographic area of California is provided a payout or award according to a paytable (such as the paytable 300 of FIG. 3).

In this example embodiment, for each lottery ticket purchased, the lottery gaming system creates a data record corresponding to that lottery ticket. For example, when a lottery terminal is used to purchase a lottery ticket, the lottery gaming system creates a data record including suitable information such as but not limited to: (1) a timestamp (date and/or time) associated with when the lottery ticket was purchased; (2) the player-selected numbers; (3) the player-selected geographic area; (3) the player-selected wager amount or wager level associated with the player-selected numbers and/or the player selected geographic area; (4) the lottery ticket identification number; and (5) any other suitable information.

In various example embodiments, this data record is created by the lottery terminal and sent by the lottery terminal to the lottery server (such as described below in connection with the lottery server 606 of FIG. 6). It should be appreciated that the lottery ticket data record can be otherwise suitably created in accordance with the present disclosure.

Figure 5:
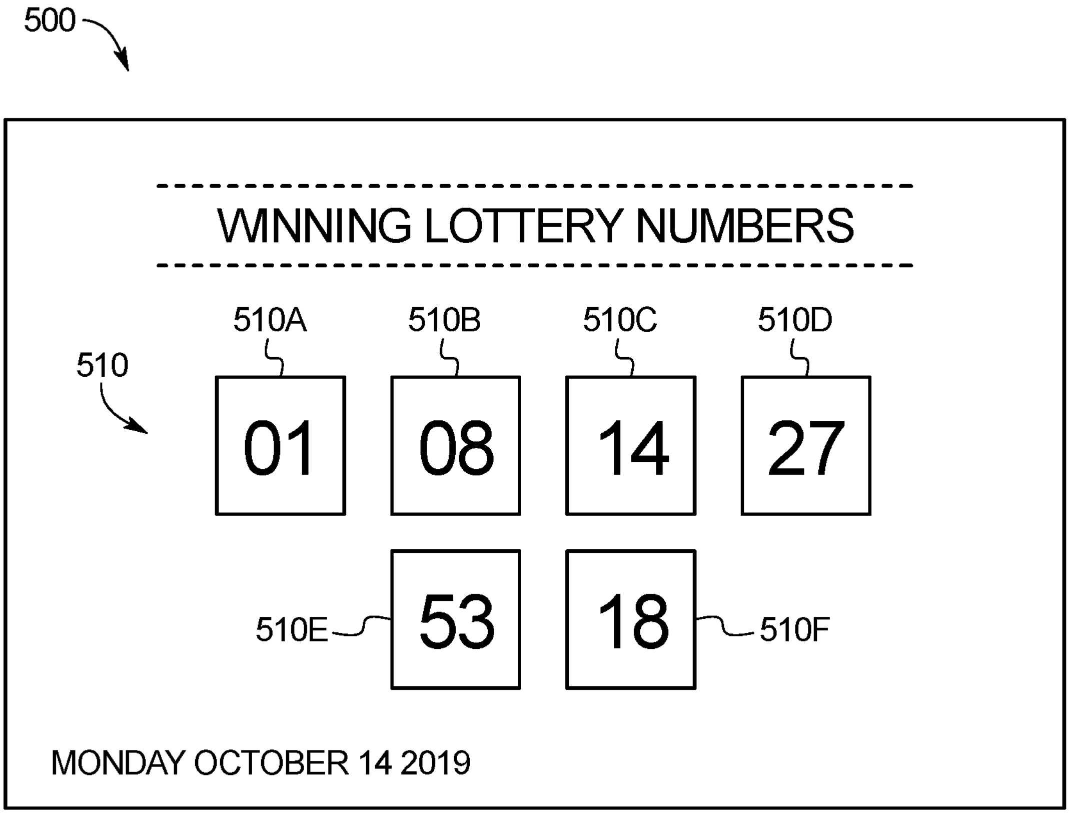
FIG. 5 is an example set of winning drawn lottery numbers of one example embodiment of the lottery gaming system of the present disclosure.

FIG. 5 illustrates an example set of winning drawn lottery numbers 500 that are drawn for a play of a lottery game. In this example embodiment, the set of winning drawn lottery numbers 500 includes a selected symbols (or numbers) portion 510 that displays the drawn lottery numbers for the play of the lottery game. It should be appreciated that in various embodiments, the set of winning drawn lottery numbers 500 may display or include additional or alternative information, such as a date/time of drawing the set of winning drawn lottery numbers, a known quantity of lottery tickets that match the set of wining drawn lottery numbers, a known geographic area where a winning lottery ticket was purchased, and/or any other relevant information. It should also be appreciated that the set of drawn winning lottery numbers provided by the lottery gaming system of the present disclosure may be alternatively configured.

In this example illustrated embodiment, the lottery gaming system randomly selects: (a) the number "1" 510A as one of the winning drawn lottery numbers, (b) the number "8" 5106 as one of the winning drawn lottery numbers, (c) the number "14" 510C as one of the winning drawn lottery numbers, (d) the number "27" 510D as one of the winning drawn lottery numbers, (e) the number "53" 510E as one of the winning drawn lottery numbers, and (f) the number "18" 510F as one of the winning drawn lottery numbers.

In this example embodiment, at the designated times for each lottery game or draw, the lottery gaming system randomly selects a winning drawn lottery number based on equal odds for selecting each number. In this example, each of the possible lottery numbers has a chance of being selected. For example, the eighty possible numbers of the number selection portion 210 of FIG. 2 each has a 1/80 chance of being selected. In this example embodiment, the lottery gaming system randomly selects a plurality of the possible player-selectable numbers (such as six of the numbers 1 through 80 (inclusive of 1 and 80). The selected winning drawn numbers are applied to any purchased lottery tickets including those specific winning drawn lottery numbers. In other words, these winning drawn lottery numbers can be used for zero, one, or a plurality of different lottery tickets purchased by zero, one, or a plurality of players.

In this example embodiment, after the lottery gaming system randomly selects the set of winning drawn lottery numbers, the lottery gaming system determines if any purchased lottery tickets match the set of winning drawn lottery numbers. More specifically, the lottery gaming system compares the set of winning drawn lottery number with player-selected numbers of any lottery tickets purchased for the play of the lottery game and determines whether any match is found. In response to determining that the set of winning drawn lottery numbers matches at least one player-selected number set of a lottery ticket, the lottery gaming system is configured provide the player an award associated with that respective player-selected number (such as upon redemption of the lottery ticket by the player).

In this example embodiment, responsive to determining that the set of winning drawn lottery numbers matches at least one player-selected number set of a lottery ticket, the lottery gaming system determines which geographical area (i.e., state) that winning lottery ticket was purchased in. For example, if a winning lottery ticket was determined to have been purchased in the state of California, then a player placing a wager on California would win a payout or award (such as the expected payout for California shown on paytable 300 of FIG. 3).

It should be appreciated from the above, that the present disclosure improves lottery gaming technology and current lottery tickets in part by providing a new way for players to interact with the lottery gaming system, and new ways to win awards that are based on the winning outcomes of one or more other players of the lottery game. It should further be appreciated from the above that the present disclosure improves lottery gaming technology in part by providing a new way to link players through the lottery gaming system. It should further be appreciated from the above that the present disclosure improves lottery gaming technology in part by providing a new way to provide a winning outcome for an otherwise non-winning lottery ticket, and thus also a way to increase lottery ticket sales. It should further be appreciated from the above that the present disclosure improves lottery gaming technology in part by providing a new type of selection for a player to make for a lottery ticket, and thus also a way to increase lottery ticket sales. It should further be appreciated from the above that the present disclosure improves lottery gaming technology in part by providing new ways to provide different types of awards lottery tickets, and thus also a way to increase lottery ticket sales. It should further be appreciated from the above that the present disclosure improves lottery gaming technology in part by providing a new way to include geographic areas in lottery games, and thus also a way to increase lottery ticket sales.

Example Lottery Gaming Systems—General

As mentioned above, in various embodiments, the lottery gaming system and method of the present disclosure are configured to be operated by a lottery agency (such as a state lottery agency).

As mentioned above, in various other embodiments, the lottery gaming system and method of the present disclosure are configured to be operated by a third party that runs the lottery for a lottery agency (such as a state lottery agency).

Figure 6:
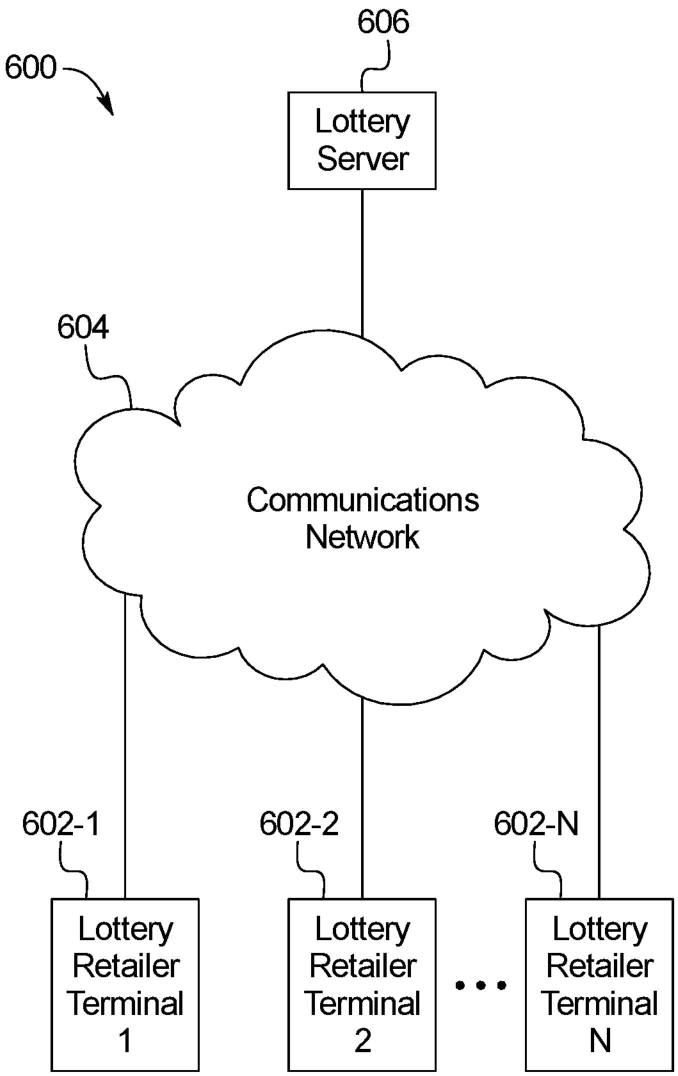
FIG. 6 is a schematic diagram of an example lottery gaming system of one embodiment of the present disclosure.

FIG. 6 illustrates an example networked lottery gaming system 600 for either such implementation. This example network lottery gaming system 600 generally includes: (1) a plurality of lottery retailer terminals 602-1 to 602-N; (2) a communications network 604; and (3) one or more lottery servers such as lottery server 606. Generally, the retailer terminals 602-1 to 602-N and the lottery server 606 are configured to perform the functions described above and further described below.

In this example embodiment, each retailer terminal 602 corresponds to (or is associated with) a particular lottery retailer. For example, the first retailer terminal 602-1 of FIG. 6 may be associated with a first lottery retailer, such as a convenience store, and the second retailer terminal 602-2 of FIG. 6 may be associated with a second lottery retailer, such as a supermarket. It should be understood that any suitable quantity of lottery retailer terminals may be employed in the lottery gaming system 600, along with any suitable quantity of corresponding lottery servers 606.

In various example embodiments, the lottery retailer terminal 602 includes one or more processor(s). Generally, the processor is operative to perform or process instructions, and in particular, to operate in accordance with the various methods described herein. For example, the processor of the lottery retailer terminal 602 may be operable to enable the lottery retailer terminal 602 to transmit data to (and receive data from) the lottery server 606. More specifically, the processor may enable the transmission of data representing each lottery ticket.

In various example embodiments, the lottery retailer terminal 602 includes one or more input device(s). The input devices of the lottery retailer terminal 602 may include components such as an optical scanner and/or a barcode scanner, for reading and/or for deriving information associated with a playslip and/or a lottery ticket. For example, a lottery ticket may include registration marks, authenticity data, various codes, micro-printed indicia, one or more sense marks, and/or other lottery indicia that must be read. Examples of additional input devices include, but are not limited to, a keypad, a mouse, an image capturing device (e.g., an optical character recognition (OCR) device), a biometric reader, a portable storage device (e.g., a memory stick), and the like.

In various example embodiments, the input device(s) of the lottery retailer terminal 602 may include a clock. The clock may be employed to detect, derive and/or append time and/or date information for use by the lottery server 606 to: (i) create a data record corresponding to lottery tickets purchased at the lottery retailer terminal 602, (ii) to determine redemption time, round and/or date information associated with lottery tickets, and/or (iii) determine whether a lottery player has redeemed their lottery ticket in a manner that qualifies the player to receive a particular redemption or settlement amount.

In various example embodiments, the lottery retailer terminal 602 includes one or more output device(s). Such output device(s) may include such components as a display for outputting information to a lottery player or to a terminal operator (e.g., win/loss information and/or payout amounts), one or more benefit output devices (e.g., a cash drawer, a currency dispenser), a printer for producing a physical record (e.g., paper slip, receipt, ticket, voucher, coupon, etc.) that defines a lottery ticket, audio/video output device(s), and the like.

In various example embodiments, the lottery retailer terminal 602 also includes one or more communications port(s), such as a serial port, a modem or the like. Generally, the communications port of the lottery retailer terminal 602 may be operable to facilitate two-way data communications between (i) the lottery retailer terminal 602, and (ii) the lottery server 606. In accordance with some embodiments, the communications port of the lottery retailer terminal 602 may operate to facilitate the transmission of information between the lottery retailer terminal and a player device such as a personal digital assistant (PDA), cell phone and/or a dedicated (e.g., a proprietary) device.

In various example embodiments, the lottery retailer terminal 602 includes a data storage device such as a hard disk, optical or magnetic media, random access memory (RAM) and/or read-only memory (ROM), or the like memory device. Generally, the data storage device of the lottery retailer terminal 602 stores a software program, the software program enabling a processor of the retailer terminal 602 to perform various functions including some or all of the various steps described herein. For example, as noted above with respect to FIGS. 1 to 5, in accordance with certain embodiments, the lottery retailer terminal 602 may be configured to perform some or all of the functions of the lottery server 606 (and vice versa) such that the lottery server 606 and the lottery retailer terminal 602 may be considered as the same "device."

In various example embodiments, a lottery sales device may be utilized in place of a lottery retailer terminal 602.

Such a lottery sales device may be implemented as a lottery server, a controller, a dedicated hardware circuit, an appropriately programmed general-purpose computer, or any other equivalent electronic, mechanical or electro-mechanical device. Thus, in various embodiments, a lottery sales device may include, for example, but is not limited to: (1) a video lottery terminal that may include a touch sensitive screen for use by a player; (2) a personal computer (e.g., which communicates with a remote lottery server); or (3) a personal mobile device such as a mobile telephone, a tablet, or a personal digital assistant. The lottery sales device may include any or all of the devices of the aforementioned systems.

In this example embodiment, the lottery server 606 operates to: (1) receive and/or store data associated with one or more lottery tickets including such data as: (a) ticket identifier(s), and (b) ticket indicia; (2) determine at least a first redemption amount associated with a lottery ticket; (3) receive a redemption request associated with the lottery ticket; (4) determine a time of play associated with the redemption request; and (5) transmit an indication of the appropriate redemption amount to a lottery retailer terminal (e.g., for output or display to a lottery player and/or lottery terminal operator).

In various example embodiments, the lottery server 606 includes one or more processor(s). Such a processor functions to process instructions, and in particular, to operate in accordance with various methods described herein. For example, the processor may operate to enable the lottery server 606 to transmit data to (and receive data from) the lottery retailer terminal 602. More specifically, the processor of the lottery server 606 may enable the transmission of data representing a lottery ticket, as well as information defining one or more payout(s) associated with that lottery ticket to or by a specific one of the lottery retailer terminals 602 shown in the lottery network 600 of FIG. 6. Thus, the lottery server 606 may be implemented as a system controller, a dedicated hardware circuit, an appropriately and particularly programmed general-purpose computer, or any other equivalent electronic, mechanical or electro-mechanical device capable of providing for one or more of the embodiments described herein.

In various example embodiments, the lottery server 606 includes one or more input device(s). Examples of such input devices include a keypad, a mouse, a touch-screen, a random number generator, a microphone, and other digital or analog input devices.

In various example embodiments, the lottery server 606 also includes one or more output device(s). Example of output device(s) of the lottery server 606 include a monitor or other display for outputting information to an operator of the lottery server 606 (e.g., for displaying information such as statistical or sales data, win and loss information and/or payout amounts), a printer for producing a physical record (e.g., a report) of such data, and the like. In addition, the lottery server 606 may include one or more communications ports, such as a serial port, modem or the like, operable to facilitate two-way data communications between (i) the lottery server 606 and (ii) one or more lottery retailer terminals 602.

In various example embodiments, the lottery server 606 includes a data storage device (e.g., a hard disk or hard drive, a media-based (removable) memory, or the like). In certain embodiments, the data storage device of the lottery server 606 stores at least one software program, which includes a program to enable the processor of the lottery server 606 to perform some or all of the various steps and functions of at least one implementation of the methods described in detail herein. In addition, the data storage device of the lottery server 606 may operate to store one or more databases including a lottery ticket database and a lottery ticket redemption status database.

In various example embodiments, the lottery server 606 includes a lottery ticket server device that is located at a lottery ticket printing facility, and may also function to manage the ticket printing process. The lottery server 606 may also function to develop a lottery game matrix (e.g., determining base payouts, win frequencies, and the like) and to match static lottery content with secure paytable (or payout distribution) data. In certain embodiments, a lottery ticket printer device for use in such lottery gaming systems may utilize the game matrix information from the lottery server and may apply it to the secure paytable data.

In certain example embodiments, a retailer terminal (such as the first retailer terminal 602-1) of FIG. 6 is configured to perform some or all of the functions of the lottery server 606. Thus, in certain example embodiments, the lottery server 606 and the retailer terminal (such as the first retailer terminal 602-1) (or another given retailer terminal and server pairing) may be considered as the same "device."

Generally, the communications network 604 of FIG. 6 includes one or more local and/or wide-area network(s) proprietary and/or public network(s) (e.g., the Internet) for facilitating two-way data communications between the retailer terminals 602 and the lottery server 606. The lottery server 606 may communicate with lottery retailer terminals 602 directly or indirectly, via a wired or wireless medium, such as via the Internet, via a local area network (LAN), via a wide area network (WAN), via an Ethernet, via a Token Ring, via a telephone line, via a cable line, via a radio channel, via an optical communications line, via a satellite communications link, or via any other appropriate communications system or combinations thereof. Any number and type of devices may be in communication with the lottery server 606, and communication between the lottery retailer terminals 602 and the lottery server 606 may be direct or indirect. A variety of communications protocols may be part of any such communications system, including, but not limited to: Ethernet (or IEEE 802.3), SAP, ATP, Bluetooth™, and TCP/IP.

It should be understood that devices in communication with each other need not be continually transmitting to each other. On the contrary, such devices need only transmit to each other as necessary, and may actually refrain from exchanging data most of the time. For example, a device in communication with another device via the Internet may not transmit data to the other device for days or weeks at a time. In some embodiments, a server may not be necessary and/or preferred. For example, in one or more embodiments, methods described herein may be practiced on a stand-alone gaming device and/or a gaming device in communication only with one or more other gaming devices. In such an embodiment, any functions described as performed by the computer may instead be performed by one or more gaming devices.

As used herein, a lottery retailer may include a merchant who sells lottery tickets at a particular location, authenticates winning lottery tickets, redeems authenticated winning lottery tickets, and/or provides awards to players for winning lottery tickets. Examples of various lottery retailers include, but are not limited to, convenience stores, gas stations, supermarkets, and gaming establishments.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The claims are as follows:

1. A lottery gaming system comprising:
a processor; and
a memory device that stores a plurality of instructions, that when executed by the processor, cause the processor to:
for a play of a lottery game:
determine one of a plurality of different geographic areas to be a selected geographic area, the selected geographic area comprising one of the plurality of different geographic areas that is predicted to be one of the plurality of geographic areas where a winning lottery ticket for a first award is purchased;
generate a lottery ticket comprising an indication of the selected geographic area;
store data associated with the lottery ticket;
cause the lottery ticket to be provided to a player, the lottery ticket comprising a selected geographic area portion comprising the indication of the selected geographic area for the play of the lottery game; and
after a draw time at which a quantity of winning draw symbols are selected for the play of the lottery game, responsive to one of a plurality of generated lottery tickets for the play of the lottery game being the winning lottery ticket for the first award and that winning lottery ticket being purchased in the selected geographic area, determine an award associated with the selected geographic area to provide to the player.

2. The lottery gaming system of claim 1, wherein the plurality of instructions, when executed by the processor, cause the processor to require a wager associated with the selected geographic area.

3. The lottery gaming system of claim 1, which comprises, for the play of the lottery game, a plurality of different awards associated with the plurality of different geographic areas.

4. The lottery gaming system of claim 3, wherein, for the play of the lottery game, the plurality of different awards associated with the plurality of different geographic areas are based on different quantities of lottery tickets for the play of the lottery game purchased in the plurality of different geographic areas.

5. The lottery gaming system of claim 1, wherein the award associated with the selected geographic area is based on a quantity of lottery tickets purchased in the selected geographic area.

6. The lottery gaming system of claim 1, wherein the award associated with the selected geographic area is based on a quantity of lottery tickets purchased in the selected geographic area relative to a quantity of lottery tickets purchased in another one of the plurality of different geographic areas.

7. The lottery gaming system of claim 1, wherein the plurality of instructions, when executed by the processor, cause the processor to communicate data to cause a display device to display a plurality of different estimated awards associated with the plurality of different geographic areas.

8. The lottery gaming system of claim 1, wherein the first award is a highest winnable award for the play of the lottery game.

9. The lottery gaming system of claim 1, wherein the selected geographic area is selectable by the player.

10. The lottery gaming system of claim 1, wherein the determination of the selected geographic area is based on a player selection of one of the plurality of different geographic areas.

11. A lottery ticket providable to a player, the lottery ticket comprising:
a selected geographic area portion comprising an indication of a selected geographic area from a plurality of different geographic areas for a play of a lottery game, wherein the selected geographic area comprises a predicted one of the plurality of different geographic areas where a winning lottery ticket for a first award for the lottery game is predicted to be purchased, and wherein the selected geographic area is associated with one of a plurality of different awards associated with the plurality of different geographic areas; and
a ticket identification portion comprising an indication of an identification of the lottery ticket.

12. The lottery ticket of claim 11, wherein the selected geographic area portion, and the ticket identification portion are on a substrate.

13. The lottery ticket of claim 11, wherein the selected geographic area portion and the ticket identification portion are displayable via a display device of a mobile device.

14. A method of operating a gaming system, the method comprising:
for a play of a lottery game by a player:
determining, via a processor, one of a plurality of different geographic areas to be a selected geographic area, wherein the selected geographic area comprises one of the plurality of geographic areas that is predicted to be where a winning lottery ticket for a first award for the play of the lottery game is purchased;
generating, via the processor, a lottery ticket comprising an indication of the selected geographic area;
storing, via the processor and a memory device, data associated with the lottery ticket;
causing the lottery ticket to be provided to the player, the lottery ticket comprising a selected geographic area portion comprising the indication of the selected geographic area; and
after a draw time at which a quantity of winning draw symbols are selected for the play of the lottery game, responsive to one of a plurality of generated lottery tickets for the play of the game being the winning lottery ticket and that winning lottery ticket being purchased in the selected geographic area, determining, via the processor, an award associated with the selected geographic area to provide the player.

15. The method of claim 14, wherein a plurality of different awards are associated with the plurality of different geographic areas, and wherein, for the play of the lottery game, the different awards associated with the plurality of different geographic areas are based on different quantities of lottery tickets for the play of the lottery game purchased in the plurality of different geographic areas.

16. The method of claim 14, wherein the award associated with the selected geographic area is based on a quantity of lottery tickets purchased in the selected geographic area.

17. The method of claim 14, wherein the award associated with the selected geographic area is based on a quantity of lottery tickets purchased in the selected geographic area relative to a quantity of lottery tickets purchased in another one of the plurality of different geographic areas.

18. The method of claim 14, which comprises, causing the processor to communicate data to cause a display device to display a plurality of different estimated awards associated with the plurality of different geographic areas.

19. The method of claim 14, wherein the gaming system is in communication with a mobile device of the player, and which comprises providing the lottery ticket via the mobile device of the player.

20. The method of claim 14, wherein determining one of the plurality of different geographic areas to be the selected geographic area comprises determining a selection by the player of the selected geographic area.

* * * * *